United States Patent [19]

Lippert

[11] Patent Number: 5,232,658
[45] Date of Patent: Aug. 3, 1993

[54] FUEL ASSEMBLY FOR A BOILING WATER REACTOR WITH A REINFORCED BOX

[75] Inventor: Hans-Joachim Lippert, Höchstadt/Aisch, Fed. Rep. of Germany

[73] Assignee: Siemens Aktiengesellschaft, Munich, Fed. Rep. of Germany

[21] Appl. No.: 837,281

[22] Filed: Feb. 18, 1992

[30] Foreign Application Priority Data

Feb. 15, 1991 [DE] Fed. Rep. of Germany ....... 9101773

[51] Int. Cl.$^5$ .................................................. G21C 3/32
[52] U.S. Cl. ................................... 376/443; 376/439; 376/434; 376/438
[58] Field of Search ............... 376/443, 439, 438, 444, 376/434; 976/DIG. 60, DIG. 61, DIG. 189

[56] References Cited

U.S. PATENT DOCUMENTS

| | | | |
|---|---|---|---|
| 3,607,642 | 9/1971 | Murdock | 376/447 |
| 3,764,471 | 10/1973 | Ripley | 376/442 |
| 4,089,743 | 5/1978 | Straalsund | 376/463 |
| 4,749,543 | 6/1988 | Crowther et al. | 376/443 |
| 4,749,544 | 6/1988 | Crowther et al. | 376/443 |
| 4,783,312 | 11/1988 | Gjertsen et al. | 376/458 |
| 4,970,047 | 11/1990 | Ueda et al. | 376/443 |
| 5,002,725 | 3/1991 | Lettau et al. | 376/444 |

FOREIGN PATENT DOCUMENTS

| | | |
|---|---|---|
| 0336203 | 10/1989 | European Pat. Off. . |
| 0365025 | 4/1990 | European Pat. Off. . |
| 3532797 | 3/1987 | Fed. Rep. of Germany . |

*Primary Examiner*—Donald P. Walsh
*Assistant Examiner*—Meena Chelliah
*Attorney, Agent, or Firm*—Herbert L. Lerner; Laurence A. Greenberg

[57] ABSTRACT

A fuel assembly for a boiling water reactor includes an elongated box extending between a top part and a bottom part, having box walls with flat outer surfaces defining a polygonal outer cross section with rounded corners, an interior and a longitudinal axis. A bundle of fuel rods is disposed in the box and aligned parallel to one another and to the longitudinal axis of the box. The fuel rods are disposed beside one another in rows parallel to the box walls. The box walls have reinforcements protruding into the interior in the vicinity of the rounded corners defining a relatively increased wall thickness, and the box walls have a relatively reduced wall thickness between the reinforcements.

7 Claims, 3 Drawing Sheets

FUEL ASSEMBLY FOR A BOILING WATER REACTOR WITH A REINFORCED BOX

The invention relates to a fuel assembly for a boiling water reactor, having an elongated box extending between a top part and a bottom part, outer surfaces of the box being flat and defining a polygonal outer cross section of the box with rounded corners, and a bundle of fuel rods disposed in the box, the fuel rods being aligned parallel to one another and to the longitudinal axis of the box and being disposed beside one another in rows parallel to the walls of the box.

Boiling water reactors contain a core configuration that has a flow of coolant, which also serves as a moderator, from bottom to top, and a plurality of fuel assemblies disposed side by side and parallel to one another in the flow. Each fuel assembly includes an elongated box extending between a top part and a bottom part. The top and bottom parts have flow openings for the coolant. In the interior of the box, there is a bundle of fuel rods, which are aligned parallel to one another and to the longitudinal axis of the box and are disposed side by side in rows parallel to the walls of the box.

In interstices between individual fuel assembly boxes, there are absorber elements, which are moved axially into and out of the interstices in order to control the nuclear reaction. The fuel assemblies themselves are packed as tightly as possible in a core zone, but the absorber elements define a minimum spacing between the fuel assemblies. Care must also be taken to ensure that the coolant is introduced through the bottom parts into the interior of the fuel assemblies at a considerable pressure, and the box walls must therefore have a certain mechanical strength, so that during reactor operation they will not bulge outward excessively, which could hinder the mobility of the absorber rods.

On the other hand, the box walls should attenuate the neutron flow in the core zone as little as possible, so that limits exist for both the minimum thickness of the box wall and for the selection of the stable material that is required.

Usually, the core zone of a boiling water reactor has a geometry in which the outer surfaces of the fuel assembly boxes define a polygonal box cross section with rounded corners. As already mentioned, the interstice between the outer surfaces of adjacent fuel assemblies is defined by the absorber elements disposed at that location, and minimum dimensions also arise for the radius of curvature of the rounded corners, which are determined by measuring lances or other reactor components. If the box therefore has a uniform wall thickness, then the geometry of the reactor core and the wall thickness required for mechanical strength also defines the available space in the interior of the box for the fuel rod bundle. The fuel rods are disposed as regularly as possible in the interior of the box. For instance, in a common commercial reactor type with a square box cross section, they are disposed in nine lengthwise rows and nine crosswise rows at right angles to the lengthwise rows. The lengthwise and crosswise rows each extend parallel to the box walls. However, from the standpoint of a low mean linear rod power, it is advantageous to make the individual fuel rods thinner and instead to provide more fuel rods, for example 10 or even 11 lengthwise and crosswise rows of fuel rods.

However, configurations of this kind with $10 \times 10$ or $11 \times 11$ fuel rods, with the conventional square basic pattern, have a disadvantageous small spacing between the fuel rods of one row (called the "fuel rod pitch"), and also have a disadvantageous wider spacing of the outermost fuel rod row from the inner wall of the fuel element box, unless the corner fuel rods disposed in the corners are moved impermissibly close to the rounded corners.

Fuel element boxes have already been proposed that still have ribs provided on the outside in the region of the rounded corners, in order to increase the stability of the box, although they do have a square internal cross section and a relatively small wall thickness. However, that does mean that less neutron-absorbing material overall is needed for the box, and since, as already explained, there is a predetermined radius of curvature of the rounded corners, the difficulties described, which arise at the transition from fuel assemblies with $9 \times 9$ fuel rods to fuel assemblies with $10 \times 10$ or $11 \times 11$ rods, are not overcome.

It is accordingly an object of the invention to provide a fuel assembly for a boiling water reactor with a reinforced box, which overcomes the hereinafore-mentioned disadvantages of the heretofore-known devices of this general type and which does so by improving the geometry of the fuel assembly.

With the foregoing and other objects in view there is provided, in accordance with the invention, a fuel assembly for a boiling water reactor, comprising an elongated box extending between a top part and a bottom part, having box walls with flat outer surfaces defining a polygonal outer cross section with rounded corners, an interior and a longitudinal axis, a bundle of fuel rods being disposed in the box and aligned parallel to one another and to the longitudinal axis of the box, the fuel rods being disposed beside one another in rows parallel to the box walls, the box walls having reinforcements protruding into the interior in the vicinity of the rounded corners defining a relatively thickened or increased wall thickness, and the box walls having a relatively reduced wall thickness between the reinforcements.

In accordance with another feature of the invention, the bundle of fuel rods has no fuel rod at intersections of two of the rows of fuel rods adjacent to two of the box walls bordering one another at the rounded corners.

In accordance with a further feature of the invention, two of the fuel rods in the rows within the bundle are spaced apart by a minimum spacing being equal to a spacing between two fuel rods in a row parallel to one of the box walls.

In accordance with an added feature of the invention, the fuel rods of two adjacent rows are staggered relative to one another in the direction of the box walls.

In accordance with an additional feature of the invention, the relatively reduced wall thickness is less than approximately 2.4 mm and preferably between 1.5 and 1.7 mm, and the relatively increased wall thickness in the vicinity of the rounded corners is between approximately 2.5 and 3.0 mm and preferably 2.7 to 2.9 mm.

With the objects of the invention in view, there is also provided, in a boiling water reactor having a core zone with a given geometry and a plurality of fuel assemblies, each of the fuel assemblies comprising an elongated box having box walls with flat outer surfaces defining a polygonal outer cross section with rounded corners, an interior and a longitudinal axis, the outer cross section being defined by the given geometry of the core zone, a bundle of fuel rods being disposed in the box and aligned parallel to one another and to the longitudinal axis of the box, the fuel rods being disposed beside one another in rows parallel to the box walls, the box walls having reinforcements protruding into the interior in the vicinity of the rounded corners defining a relatively increased wall thickness, and the box walls having a relatively reduced wall thickness between the reinforcements.

Other features which are considered as characteristic for the invention are set forth in the appended claims.

Although the invention is illustrated and described herein as embodied in a fuel assembly for a boiling water reactor with a reinforced box, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
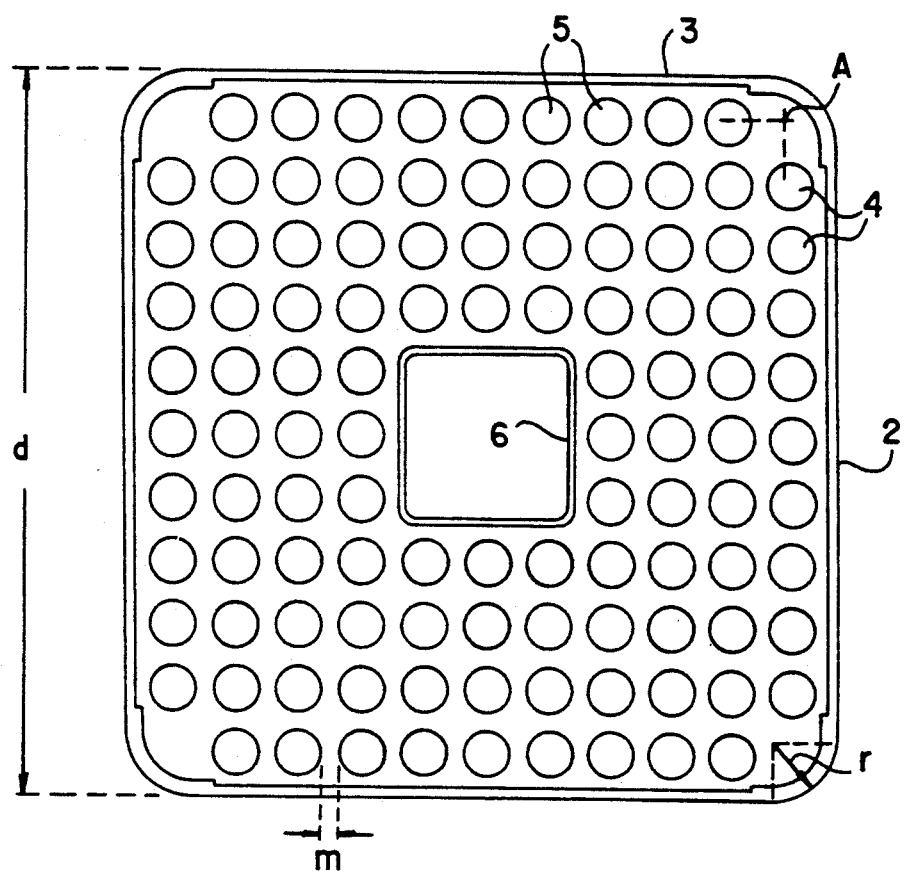
FIG. 1 is a diagrammatic, cross-sectional view of a fuel assembly according to a first embodiment of the invention.

Referring now to the figures of the drawing in detail and first, particularly, to FIG. 1 thereof, there is seen a cross section through a fuel assembly according to the invention, which is covered laterally by walls 2 and 3 of a fuel assembly box, at the bottom by a bottom or base part and at the top by a top or cap part. A coolant, serving as a moderator, is introduced through flow openings in the bottom part, flows upward in interstices between fuel rods 4 and 5, and emerges again through flow openings in the top part. It may be advantageous to place an elongated tube 6 in the interior of the fuel assembly box. This tube 6 carries a flow of liquid coolant through it over its entire length, while the coolant flowing along the fuel rods is heated by the rods and is present in the upper part of the fuel assembly as a mixture of liquid and steam. In the box, the tube or water tube 6 assures that sufficient liquid coolant, as the moderator, will be present in the upper part of the fuel assembly as well.

In the most common box, the fuel assembly has a square cross section, in which reference symbol d indicates the maximum spacing between the outer surfaces of opposite box walls, which is predetermined by the geometry in the core zone of the reactor. This geometry also determines a radius of curvature r at rounded corners of the box.

The invention provides flat surfaces for the outsides of the box walls, the spacing of which have the value d. The corners are rounded in accordance with the predetermined radius r.

As is typical in the prior art, the fuel rods are each disposed in rows in such a way that the minimum spacing between two adjacent fuel rods of a bundle is equal to the spacing of two fuel rods that are adjacent one another in a row parallel to one box wall. These lengthwise and crosswise rows, which are defined by the minimum fuel rod spacing, accordingly extend parallel to the box walls 2 and 3.

In the exemplary embodiment of FIG. 1, the lengthwise rows and crosswise rows are each formed by 11 fuel rods. In order to keep a minimum spacing m as great as possible despite this high number of fuel rods, the spacing between the inner surfaces of the opposite box walls is increased by reducing the thickness of the box walls 2 and 3. While wall thicknesses of 3 mm have previously been typical, and even uniform wall thicknesses of 2.7 mm and 2.54 mm have been considered adequate, wall thicknesses of less than 2.4 mm, and in particular between 1.5 and 1.7 mm, are used in this case.

With previously known materials, this would not have been adequate for the stability of the box. Nevertheless, this stability is attained, because the box walls are thickened in the region of the rounded corners by a reinforcement that protrudes into the interior of the box. Thicknesses between 2.5 mm and 3.0 mm and preferably 2.7 to 2.9 mm, are adequate for this thickening.

These thickenings in the wall regions reduce the space available for a corner rod and the intersections of the rows of fuel rods bordering the walls 2 and 3. However, in many boxes, it is readily possible for such corner rods to be thinner than the others, which is already known.

In the present box, no fuel rod whatsoever is provided at the aforementioned points of intersection of the two peripheral rows, such as at a position A. It is therefore unnecessary with the selected configuration to manufacture and use fuel rods having a different diameter in order to nevertheless assure that a predetermined minimum value for the flow cross section, or in other words a minimum spacing between the inner surfaces of the box and the adjacent fuel rods, is also adhered to in the region of the rounded corners for the coolant flowing along the vicinity of the box wall.

As compared with a configuration of 9×9=81 fuel rods, despite the tube 6 which occupies the cross section of 3×3 fuel rods and despite the four missing corner rods, the present geometry still has a total number of 11×11−(3×3)−4=108 fuel rods.

Figure 2:
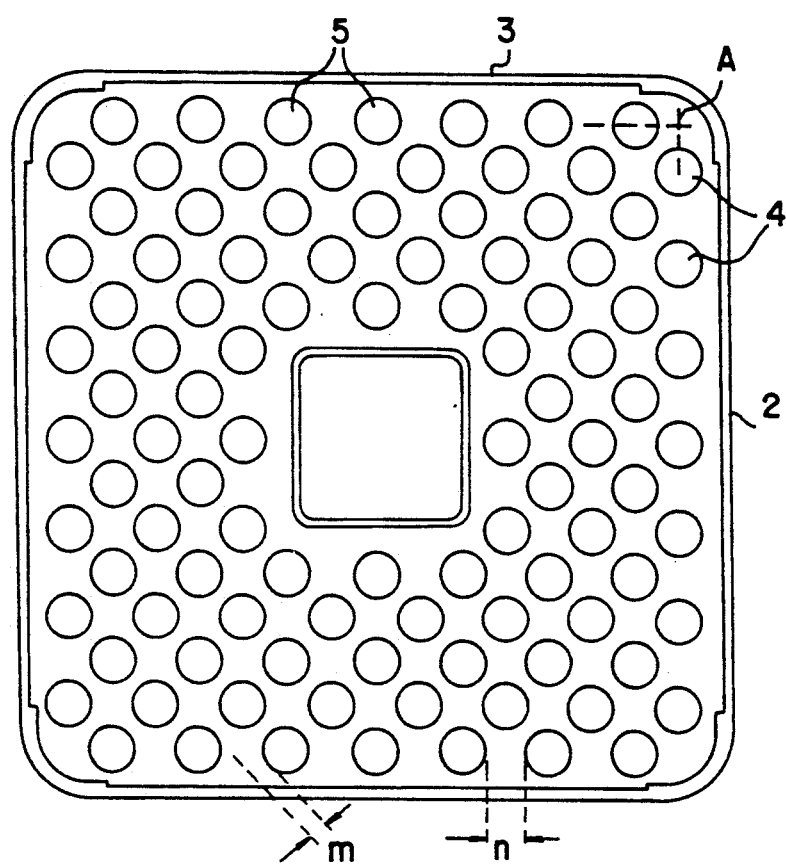
FIG. 2 is a view similar to FIG. 1 of a second embodiment of the invention.
Figure 3:
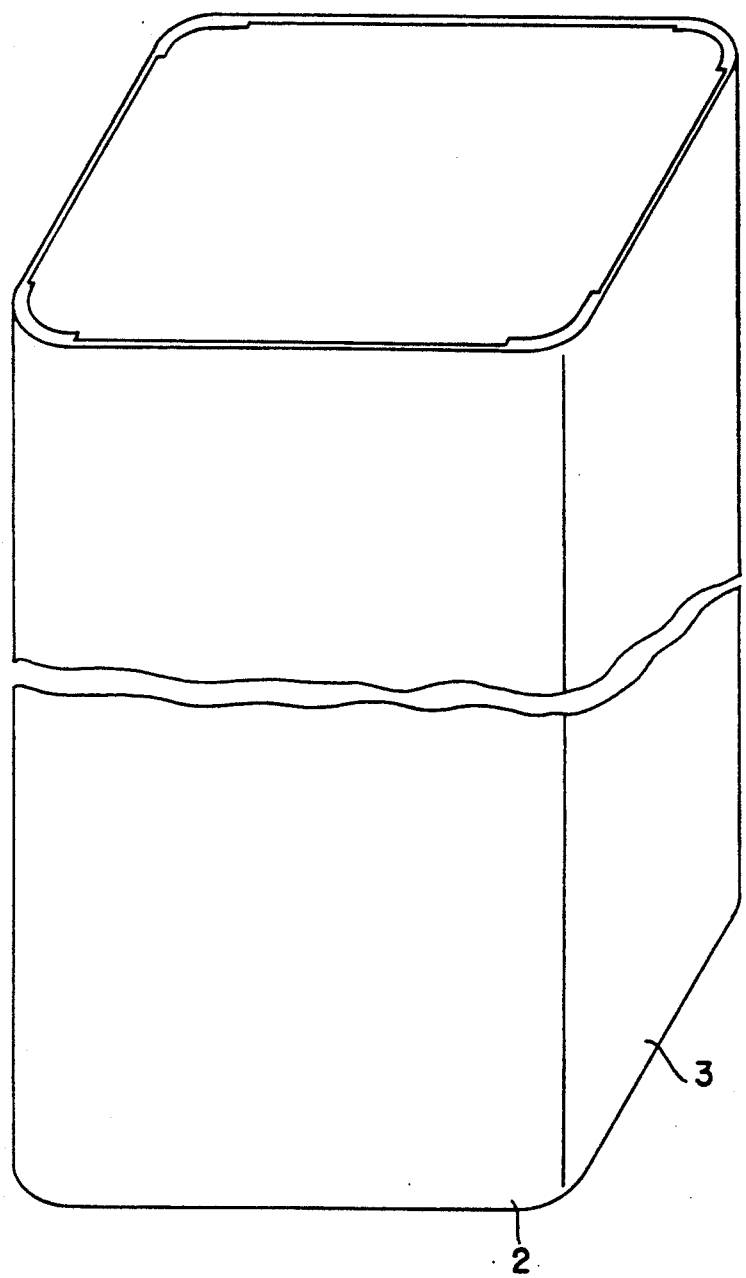
FIG. 3 is a partly broken-away front, side and top perspective view of the reinforced box of FIGS. 1 and 2.

An in-between number of 100 fuel rods can advantageously be attained in accordance with FIG. 2. In the FIG. 2 embodiment, the distribution of the fuel rods is especially uniform, even in the corner regions. In this box, the fuel rods 4 and 5 next to the box walls are again disposed in a row parallel to the box walls, and the other fuel rods are disposed in lengthwise and crosswise rows parallel to them.

However, a spacing n of the fuel rods in these rows is greater than the minimum spacing m between adjacent fuel rods. In other words, fuel rods having the minimum spacing m are located in rows that are inclined relative to the box walls.

This geometry permits a configuration in which there is already no fuel rod provided in the position A. Accordingly, no fuel rod needs to be left out in order to adhere to a minimum spacing between the box wall and adjacent fuel rods.

Accordingly, in its outer dimensions, the novel fuel assembly meets all of the demands specified by the geometry of the reactor core. The fuel rods themselves are distributed in a simple, clear and advantageous way over the cross section, and make optimal use of the available cross-sectional area with a view to wide spacings between one fuel rod and adjacent fuel rods or walls. The total fuel provided for one fuel assembly is distributed over a desired higher number of fuel rods, each with a correspondingly smaller diameter.

I claim:

1. A fuel assembly for a boiling water reactor, comprising an elongated box having box walls with flat outer surfaces defining a polygonal outer cross section with rounded corners, an interior and a longitudinal axis, a bundle of fuel rods being disposed in said box and aligned parallel to one another and to the longitudinal axis of said box, said fuel rods being disposed beside one another in rows parallel to said box walls, said box walls having reinforcements protruding into said interior in the vicinity of said rounded corners defining a relatively increased wall thickness, and said box walls having a relatively reduced wall thickness between said reinforcements, said bundle of fuel rods having no fuel rod at intersections of two of said rows of fuel rods adjacent to two of said box walls bordering one another at said rounded corners.

2. The fuel assembly according to claim 1, wherein said elongated box extends between a top part and a bottom part.

3. The fuel assembly according to claim 1, wherein two of said fuel rods in said rows within said bundle are spaced between apart by a minimum spacing being equal to a spacing between two fuel rods in a row parallel to one of said box walls.

4. The fuel assembly according to claim 1, wherein said fuel rods of two adjacent rows are staggered relative to one another in the direction of said box walls.

5. The fuel assembly according to claim 1, wherein said relatively reduced wall thickness is less than approximately 2.4 mm, and said relatively increased wall thickness in the vicinity of said rounded corners is between approximately 2.5 and 3.0 mm.

6. The fuel assembly according to claim 1, wherein said relatively reduced wall thickness is less than approximately between 1.5 and 1.7 mm, and said relatively increased wall thickness in the vicinity of said rounded corners is between approximately 2.7 to 2.9 mm.

7. In a boiling water reactor having a core zone with a given geometry and a plurality of fuel assemblies, each of said fuel assemblies comprising an elongated box having box walls with flat outer surfaces defining a polygonal outer cross section with rounded corners, an interior and a longitudinal axis, said outer cross section being defined by the given geometry of the core zone, a bundle of fuel rods being disposed in said box and aligned parallel to one another and to the longitudinal axis of said box, said fuel rods being disposed beside one another in rows parallel to said box walls, said box walls having reinforcements protruding into said interior in the vicinity of said rounded corners defining a relatively increased wall thickness, and said box walls having a relatively reduced wall thickness between said reinforcements, said bundle of fuel rods having no fuel rod at intersections of two of said rows of fuel rods adjacent to two of said box walls bordering one another at said rounded corners.

* * * * *